United States Patent [19]
Mooney

[11] Patent Number: 5,970,919
[45] Date of Patent: Oct. 26, 1999

[54] MAT FOR ANIMALS

[75] Inventor: Patrick Roy Mooney, Dublin, Ireland

[73] Assignee: Pemarsa S.A., Alicante, Spain; Part Interest

[21] Appl. No.: 08/817,217

[22] PCT Filed: Oct. 2, 1995

[86] PCT No.: PCT/IE95/00051

§ 371 Date: Mar. 31, 1997

§ 102(e) Date: Mar. 31, 1997

[87] PCT Pub. No.: WO96/10329

PCT Pub. Date: Apr. 11, 1996

[30] Foreign Application Priority Data

Sep. 30, 1994 [IE] Ireland .................................. S940795

[51] Int. Cl.[6] .................................................. A01K 1/015
[52] U.S. Cl. ............................ 119/526; 119/509; 428/156
[58] Field of Search .................................. 119/526, 503, 119/509, 28.5; 15/238; D6/582; 428/156

[56] References Cited

U.S. PATENT DOCUMENTS

| | | | |
|---|---|---|---|
| 1,123,094 | 12/1914 | Cary | D6/582 X |
| 3,050,329 | 8/1962 | Pagan | D6/582 X |
| 4,211,185 | 7/1980 | Karlsson | 119/526 |
| 4,961,930 | 10/1990 | Perdelwitz, Jr. et al. | 119/28.5 X |
| 4,976,221 | 12/1990 | Yetter | 119/509 |
| 5,266,378 | 11/1993 | Stephenson et al. | 428/156 |

*Primary Examiner*—Michael J. Carone
*Assistant Examiner*—Elizabeth Shaw
*Attorney, Agent, or Firm*—Flanagan & Flanagan; John R. Flanagan; John K. Flanagan

[57] ABSTRACT

A mat for an animal, particularly a female mammal such as a sow comprises a main body (3) provided with a ridge (5') adapted for a sow to lie along one side thereof so that the sow's udder rests on the ridge and thus is made more accessible to piglets. The ridge (5') preferably extends along a central longitudinal axis of the mat and optionally includes a bacteriocidal agent.

8 Claims, 7 Drawing Sheets

MAT FOR ANIMALS

The present invention relates to a mat for animals, for example sows feeding a litter of piglets, or other mammals with similar type udders.

When a sow is feeding her litter of piglets, it is very difficult for all of the piglets to have equal access to the udder and teats. Some sows, when lying down, only partially expose their full range of teats. Some piglets therefore obtain less milk than others and do not gain weight. Weak small piglets can also be denied access to the sows' teats by the larger and stronger piglets thereby compounding the problem. This results in a litter of piglets of varying weights and sizes. Furthermore, there can be high piglet mortality rates since weak smaller piglets can be trampled on or crushed by the sow herself. These are serious problems which have economic implications for piggeries.

The present invention provides a mat for an animal, particularly a female mammal such as a sow, comprising an elongate ridge which is adapted for the sow to lie along one side thereof so that the sow's udder rests on the ridge and thus is made more accessible to piglets which are fed by the sow.

Advantageously, the ridge extends along a longitudinal axis of the mat and the remainder of the mat is of a generally flat construction. Preferably, the ridge extends along the central longitudinal axis of the mat. The ridge and the flat portion may be integrally formed.

Ideally the mat is manufactured from a non-absorbent elastomeric material with good insulation and comfort features such as ethyl vinyl acetate (EVA), rubber or plastics material and advantageously includes a bacteriocidal agent.

The ridge may extend the full length of the main body of the mat or it may be shortened to various lengths to suit the requirements of the sow and her udder or teats.

Conveniently, the ridge extends beyond the flat portion of the mat at one or either end of the mat so that waste material will not deposit on the flat portion of the mat or that the animal will not be insulated from the cooling effect of a concrete floor in hot environments. The mat is of dimensions such that it is adapted for use in a farrowing unit or pig pen such as those used in piggeries. The width of the mat may be extended beyond the area allowed to the sow to include an insulated area for the piglets.

In one embodiment, the mat includes a plurality of apertures extending from the top surface to the bottom surface of the mat, whereby water and semi-liquid matter may pass through the mat. The apertures may be in the form of slots or slits provided on a flat portion of the mat.

The invention will now be described more particularly, with reference to the accompanying drawings, which show by way of example only, several embodiments and modifications of the mat according to the present invention.

In the drawings, in which like parts are referred to by like numerals:

FIGS. 1A and B are perspective views of two alternative embodiments of the ridge;

FIG. 9C shows the ridge placed along the central longitudinal axis;

Figure 1A:
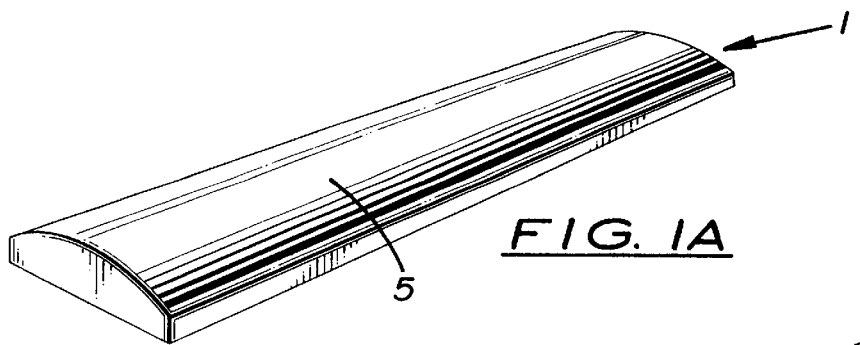
Figure 1B:
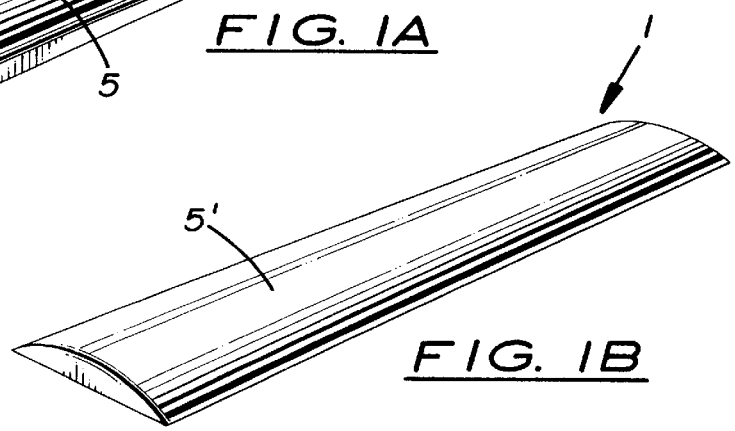

Referring initially to FIGS. 1A and 1B, a mat in accordance with the invention is indicated generally by the reference numeral 1 and comprises a ridge 5,5'. The ridge 5 in the embodiment shown in FIG. 1A is semi-ellipsoidal in cross-section and in the other embodiment shown in FIG. 1B the ridge 5' is substantially trapezoidal in cross-section. The ridge 5,5' is designed so that when a sow is lying on her side on the mat, her udder is supported and the teats are held in a manner so that they are easily accessible to the piglets. The ridge 5,5' also acts to protect the piglet as it is more difficult for the sow to roll over.

Figure 2:
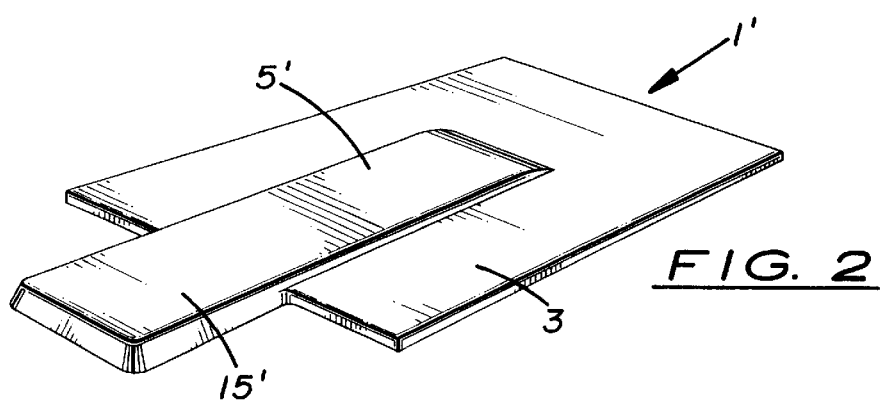
FIG. 2 is a perspective view of the mat.

Referring to FIG. 2 of the drawings, in an alternative embodiment, the mat comprises a main body 3 and a ridge 5' provided on the main body 3. The ridge 5' serves the same function as described above.

The ridge 5' has a portion 15' extending from the main body so that waste products generated by the sow will fall onto the ridge portion 15 and from there, are directed into slots provided in the floor of the sow pen. The width of the main body 3 of the mat can be dimensioned appropriately so as to allow space for the sow and the piglets. Alternatively, it can be of dimensions appropriate to allocate only the sow herself since it has been found that the sow herself is more comfortable lying on the mat of the present invention and can be impregnated again sooner after delivery of a litter than would otherwise be the case.

Figure 3:
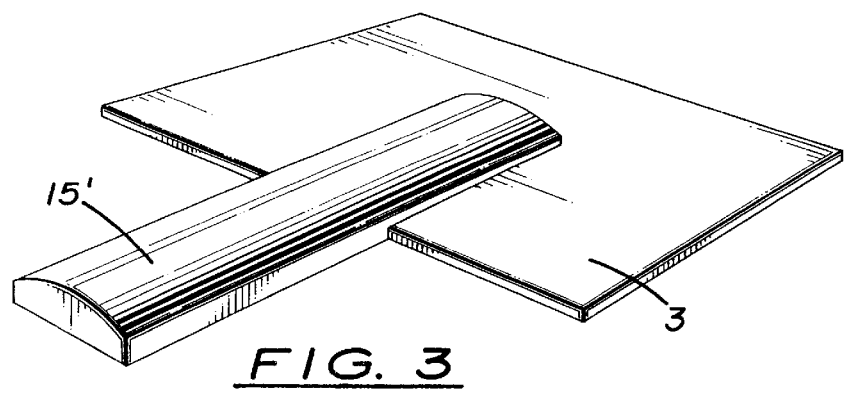
FIG. 3 is a perspective view of the mat in an alternative embodiment with a short ridge.

Referring now to FIG. 3, the ridge 15' does not extend the full length of the main body 3 of the mat. The area provided by not having the ridge extending the full length of the main body 3 allows the sow to rest her head comfortably.

Figure 4A:
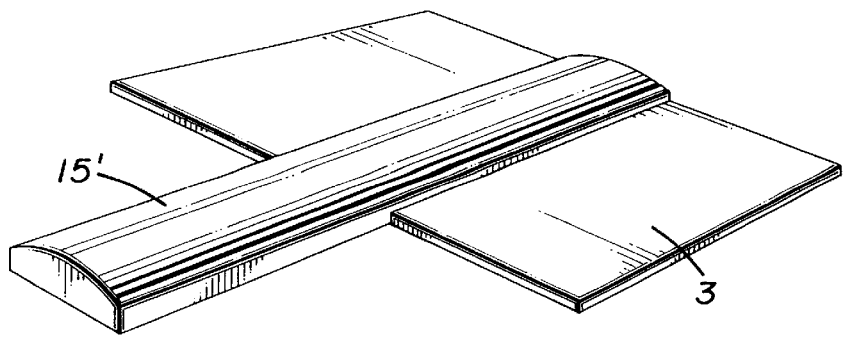
FIGS. 4A and 4B are perspective views respectively of the mat with semi-elliptical cross-sectional and trapezoidal cross-section ridge with the extended width to include an area for piglets.
Figure 4B:
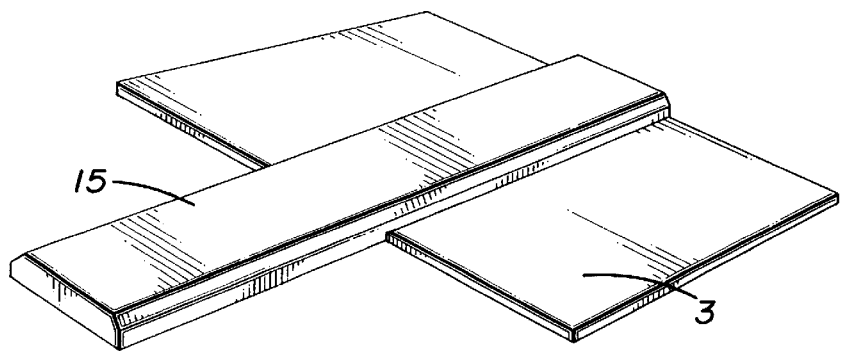

Referring now to FIGS. 4A and 4B, an alternative embodiment of the mat is shown in which the main body 3 is wider so as to include sufficient area for piglets to be comfortably allocated space on the mat.

Figure 5A:
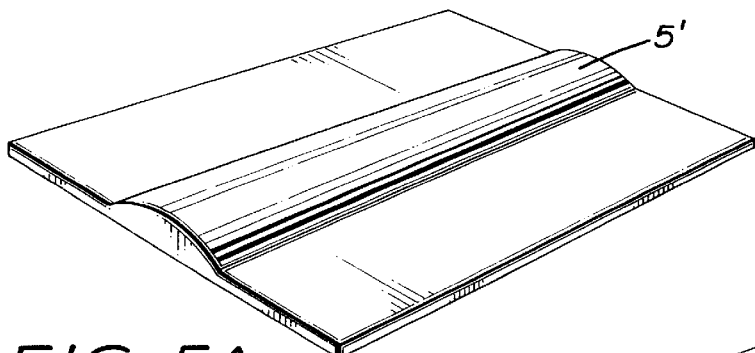
FIGS. 5A and 5B are perspective views respectively of the mat with ridges of semi-elliptical cross-section and trapezoidal cross-section with the main body portion of the mat extending on both sides of the ridge.
Figure 5B:
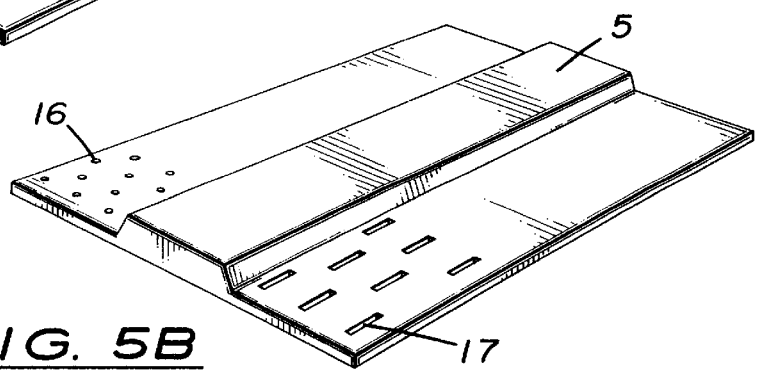

Referring now to FIGS. 5A and 5B, an alternative embodiment of the mat is shown in FIG. 5B in which round or rectangular shaped slots 16,17 are provided on the mat for removal of excrement.

Figure 6:
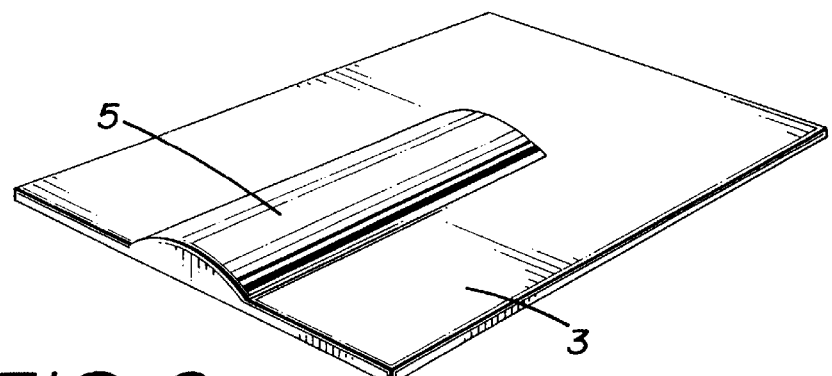
FIG. 6 is a perspective view of the mat with a short ridge for the sows head with full mat on both sides of the ridge.

Referring now to FIG. 6, the bottom portion of the mat may include slots to allow removal of excrement.

Figure 7:
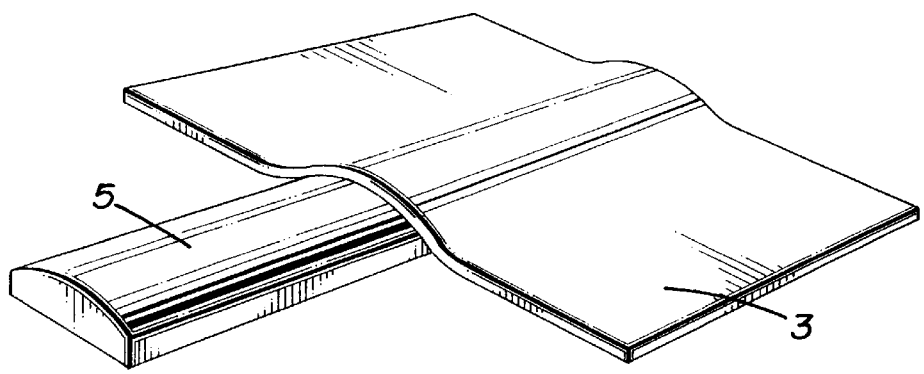
FIG. 7 is a perspective view of the mat with the ridge extended under the mat.
Figure 8:
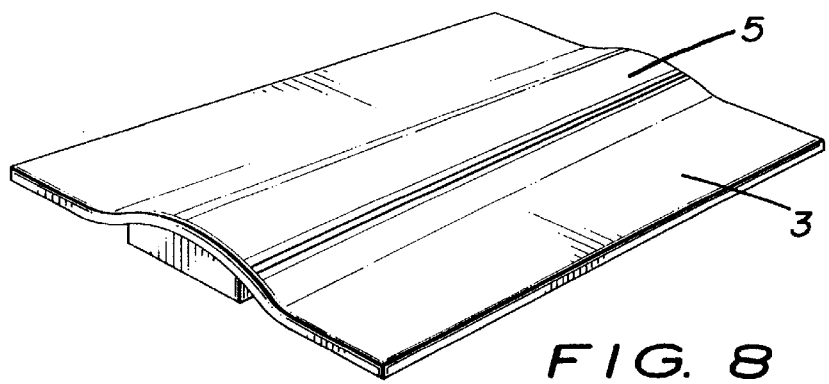
FIG. 8 is a perspective view of the mat with the mat extended on both sides of the ridge and with the ridge under the mat.
Figure 9A:
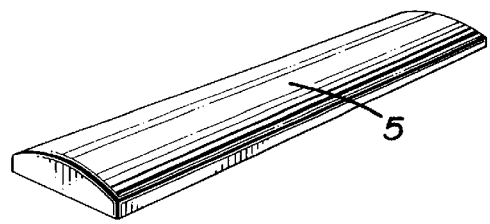
FIGS. 9A–9F are perspective views of the mat in various embodiments.
Figure 9B:
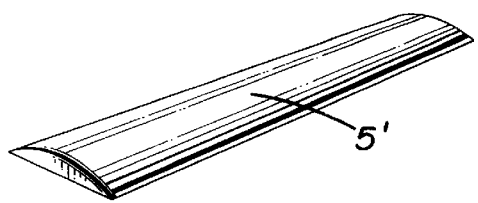
Figure 9C:
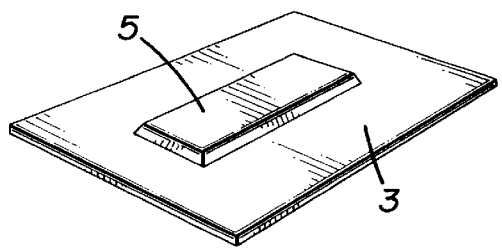
Figure 9D:
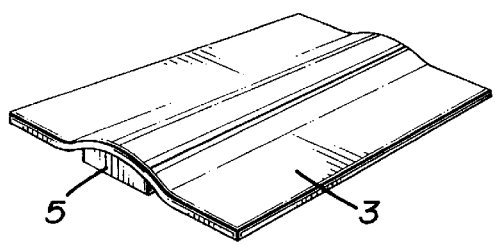
Figure 9E:
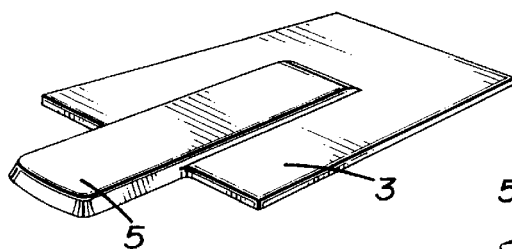
Figure 9F:
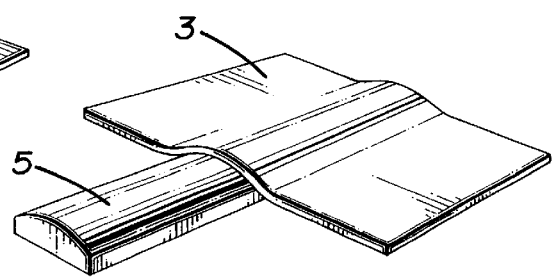

Ideally the ridge is an integral part of the mat, however, in alternative embodiments shown in FIGS. 7 and 8, the ridge may be separate from the body portion of the mat. In these embodiments there is a gap between the ridge underneath the mat and the main body of the mat itself. With the sow lying on the mat, the presence of this gap creates a trough which makes it even more difficult for the sow to roll over and crush the piglets. The ridge may be of any cross-sectional profile such as semi-ellipsodial or trapezoidal.

Figure 10:
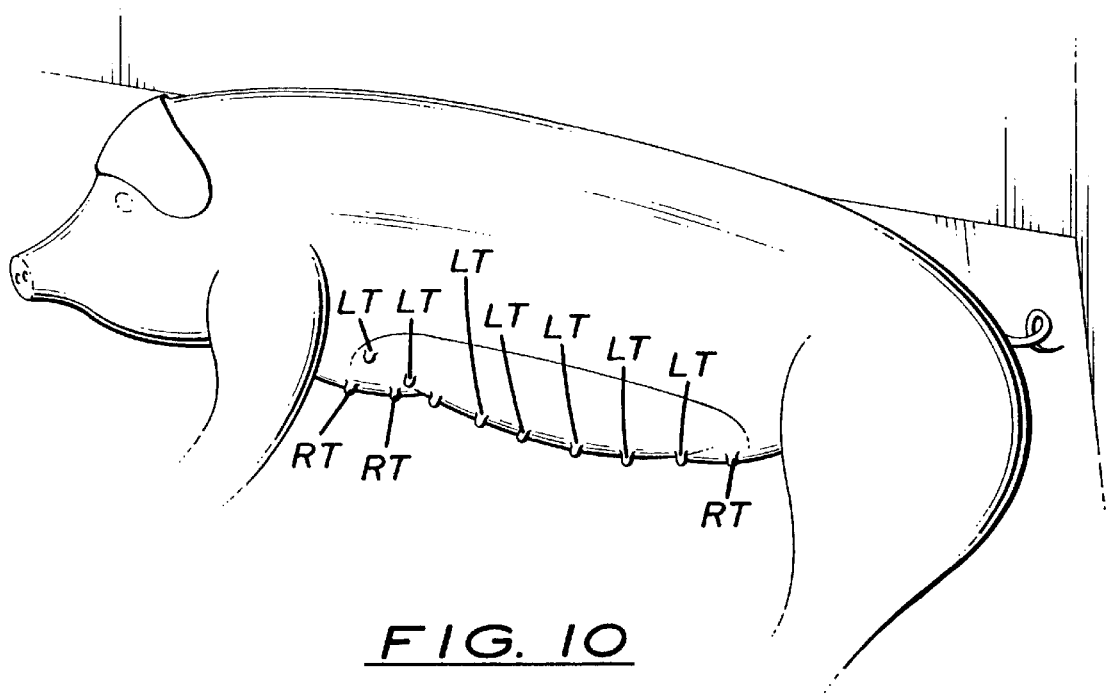
FIG. 10 is a schematic drawing indicating a sow lying on her right side on a flat surface as occurs in the prior art.

Referring now to FIG. 10 [LT] indicates the left teats and [RT] indicates the right teats. The sketch shows that on a flat surface, only four left teats and only two right teats are fully accessible. It is also intended to show that in the prior art, there is no impediment to the sow rolling over to her left side and squashing the piglets.

Figure 11:
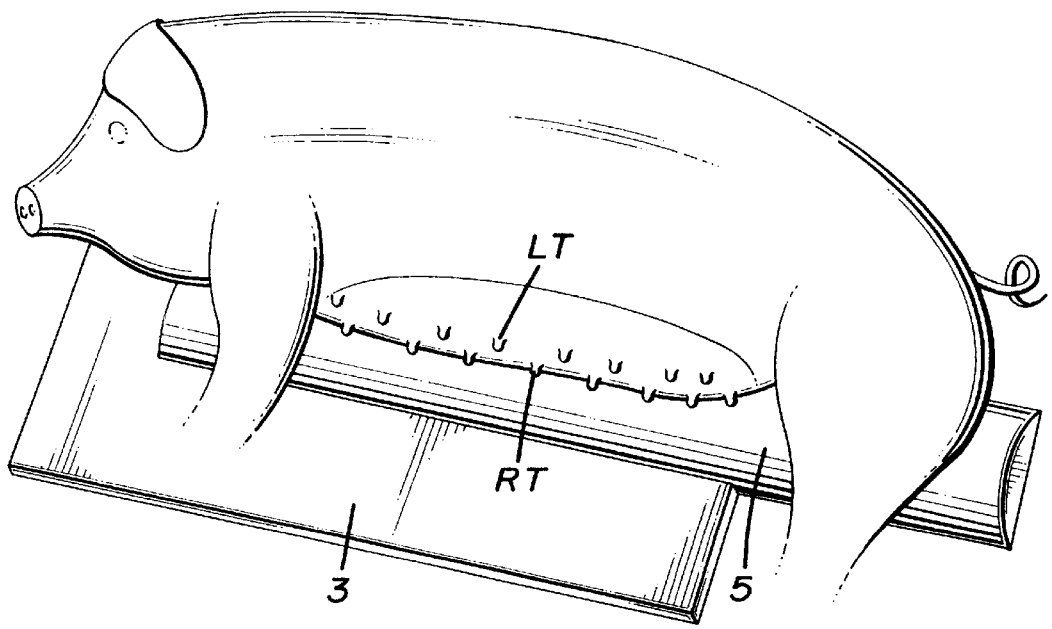
FIG. 11 is a schematic drawing indicating a sow lying on her right side on the mat.

Referring now to FIG. 11, a sow is shown laying on her right side on the mat and the ridge result in full exposure and accessibility to piglets of eight left teats and eight right teats. The present of the ridge also provides an extra degree of difficulty and time delay for the sow to alter her position and thus reduces the risk of the sow damaging the piglets.

Figure 12:
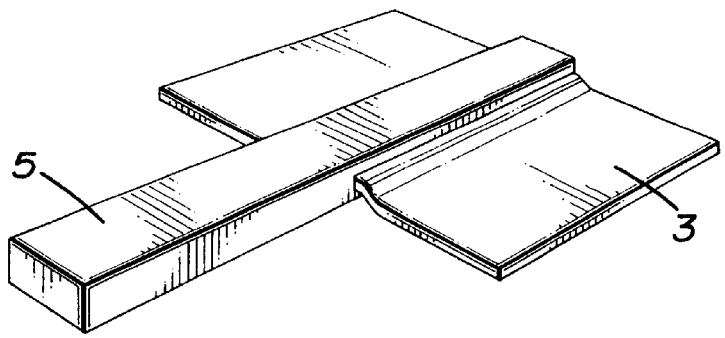
FIGS. 12, 12A and 12B are perspective views of the mat.
Figure 12A:
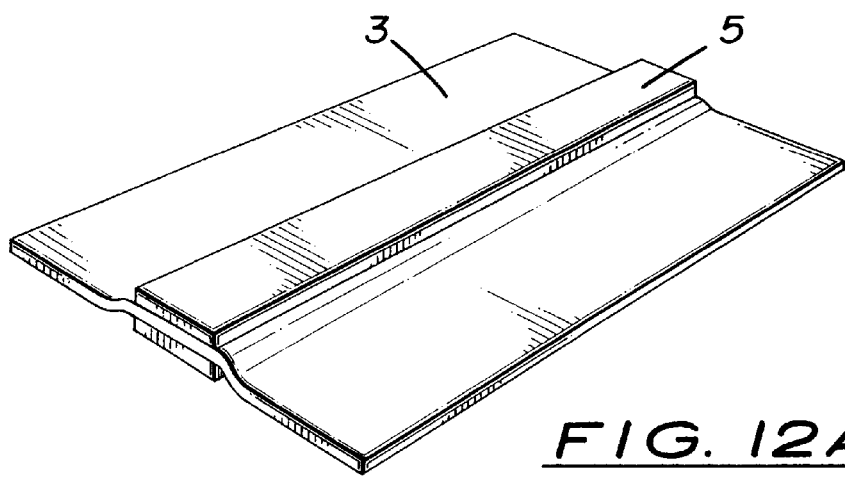
Figure 12B:
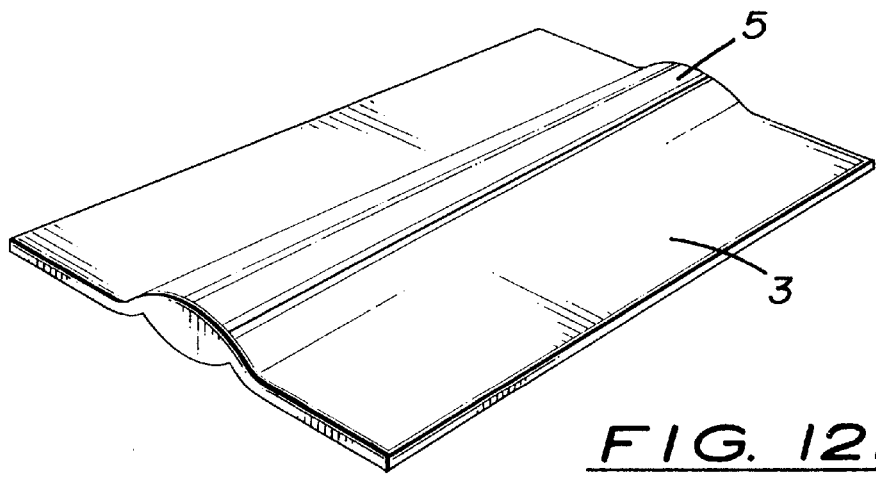

Referring now to FIGS. 12A and 12B, alternative embodiments of the mat are shown with a ridge provided on both sides of the mat. This allows the mat to be inverted and useful with either upperside or underside exposed to the sow.

Figure 13A:
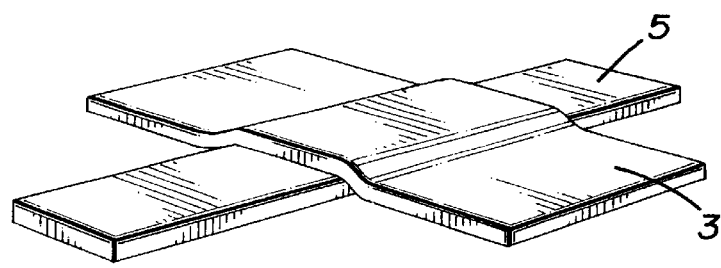
FIGS. 13A and 13B are perspective views of the mat.
Figure 13B:
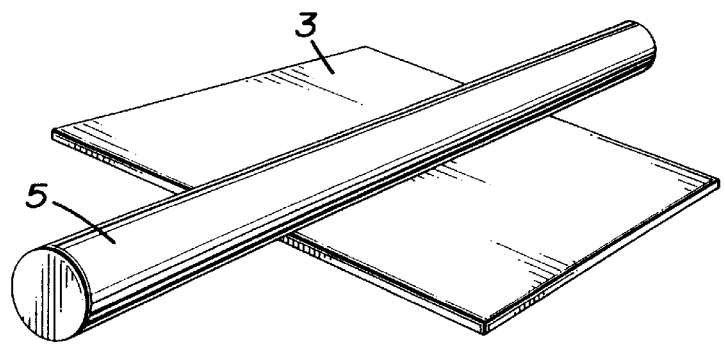
Figure 14:
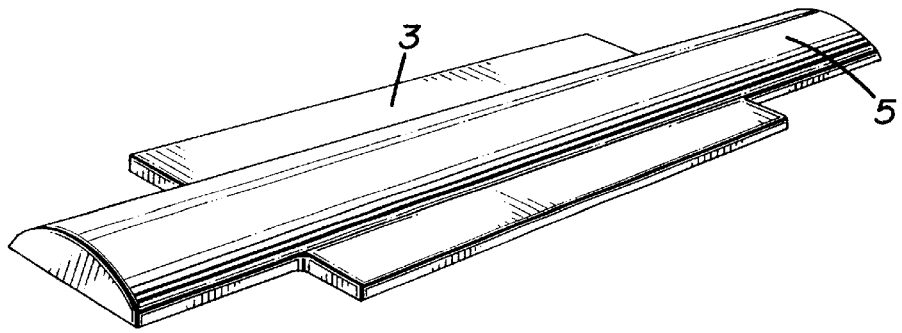
FIG. 14 is a perspective view of a modified mat and two cross-sectional views showing the width of the mat.

Referring now to FIGS. 13A and 13B, alternative embodiments of the mat are shown with the ridge extending beyond the main body of the mat on both the upperside and on the underside of the mat allowing inter alia for the sows' feet to be off the mat when she is standing. The ridge may be on the upperside or underside of the mat or may be on both sides of the mat.

The mat 1,1' has the important advantage that its use can result in reduction in piglet mortality due to squashing, smothering and crushing by the sow. The mat with a ridge along the underside of the mat offers the piglet better protection due to the resulting space between the floor and mat. Also, use of the mat results in improving the general well-being, health and performance of the sow. Since the ridge is positioned along the central longitudinal axis and due to the confined space of the farrowing box or pen, this encourages the sow to lay firstly on her belly/udder and the ridge causes her to gently rolls over so that her back is the furthest from the ridge and her udder is resting on the ridge.

The mat according to the invention is made from elastomeric material including an anti-bacterial agent. By providing a mat with good insulating properties and with a high degree of comfort, it promotes the sow to convert her feed into a improved quality and quantity of milk. Furthermore, the sow's general health is improved encouraging her to commence her breeding cycle shortly after weaning with a high embryo count.

It will of course be understood that the invention is not limited to the specific details described herein, which are given by way of example only, and that various modifications and alterations are possible within the scope of the invention as defined in the appended claims.

I claim:

1. A mat for an animal, particularly a female animal such as a sow, comprising an elongate ridge (5,5') which is adapted for the sow to lie along one side thereof, so that the sow's udder rests on the ridge and thus is made more accessible to piglets which are fed by the sow, the ridge (5,5') extending along a longitudinal axis of the mat and the remainder (3) of the mat being of a generally flat construction, the ridge (5,5') further extending beyond the flat remainder (3) of the mat at least at one end of the mat, so that waste material will not deposit on the flat remainder of the mat or that the animal will not be insulated from the cooling effect of a concrete floor in hot environments.

2. A mat as claimed in claim 1, in which the ridge (5,5') and the flat remainder of the mat are integrally formed.

3. A mat as claimed in claim 1 in which the mat (1) is dimensioned to fit within a farrowing pen or other pig housing pen.

4. A mat as claimed in claim 1, in which the mat (1) is manufactured from a non-absorbent elastomeric material with good insulation and comfort features.

5. A mat as claimed in claim 1, in which the material is ethyl vinyl acetate (EVA), rubber or polymeric material.

6. A mat for an animal, particularly a female animal such as a sow, comprising an elongate ridge (5,5') which is adapted for the sow to lie along one side thereof, so that the sow's udder rests on the ridge and thus is made more accessible to piglets which are fed by the sow, the mat having a bacteriocidal agent incorporated into the mat's structure.

7. A mat for an animal, particularly a female animal such as a sow, comprising an elongate ridge (5,5') which is adapted for the sow to lie along one side thereof, so that the sow's udder rests on the ridge and thus is made more accessible to piglets which are fed by the sow, the mat having a plurality of apertures (16,17) extending from a top surface to a bottom surface of the mat, whereby water and semi-liquid matter may pass through the mat.

8. A mat as claimed in claim 7 in which the apertures are in the form of slots or slits (16,17) provided in a flat remainder (3) of the mat.

* * * * *